United States Patent Office 3,069,317
Patented Dec. 18, 1962

3,069,317
TERPIN HYDRATE SUSPENSIONS
Erik H. Jensen, Kalamazoo Township, Kalamazoo County, Mich., assignor to The Upjohn Company, Kalamazoo, Mich., a corporation of Michigan
No Drawing. Filed Oct. 7, 1957, Ser. No. 688,440
12 Claims. (Cl. 167—55)

This invention relates to a therapeutic suspension and more particularly to a stable aqueous suspension for oral use comprising terpin hydrate.

Terpin hydrate has been useful in medical practice for many years as an expectorant. However, the limited solubility of terpin hydrate, to the extent of only one-half of one percent, has precluded the medicinal use of aqueous solutions of this important medicament. As much as one-half ounce of water is required to dissolve the usual 85 milligram dosage of terpin hydrate. Thus, a satisfactory dosage of terpin hydrate, in aqueous solution, would require the ingestion of excessive and inconvenient amounts of solution. Prior to the instant invention, the dosage form of choice was terpin hydrate elixir. The National Formulary of 1955, at page 594, shows that this elixir contains 43 percent alcohol and 40 percent glycerin. The alcohol and glycerin of this elixir are used to increase the solubility of terpin hydrate in the vehicle. However, as much as one teaspoonful of the elixir is needed to supply a satisfactory dosage. Repeated dosage results in the needless consumption of increasing amounts of alcohol.

Attempts have been made to prepare aqueous suspensions of terpin hydrate alone and with other active ingredients, including a medullary cough center pressant-antitussive agent. A serious difficulty in such suspensions has been the increase in crystal size of the suspended terpin hydrate which occurs on ageing. This increase is followed by aggregation of the crystals and settling. These factors result in coarseness to the taste, difficulty in resuspending to original homogeneous constitution and the probability of ingesting uncontrolled dosages of the therapeutic agent. A novel departure from the usual methods is required to find a substance or substances which will retard or negative the tendency of the terpin hydrate to grow in crystal size. The unexpected property of counteracting and retarding this tendency has been found in a mixture of stearates as disclosed in this invention.

The principal object of this invention is to provide a stable, palatable aqueous suspension of terpin hydrate. Another object is to provide an aqueous suspension of terpin hydrate in which deleterious crystal growth of the terpin hydrate does not occur. Still another object is to provide an aqueous suspension of terpin hydrate in which aggregation of the internal or discontinuous phase is retarded. A further object is to provide an easily resuspendible aqueous suspension of terpin hydrate, which can be administered in a uniform, controlled dosage. A still further object is to provide an aqueous suspension of terpin hydrate which is free from alcohol and which possesses a soothing, demulcent action on mucous membranes. A still further object is to provide an aqueous suspension of terpin hydrate and an antitussive agent which is devoid of addiction liability and is free from side effects such as constipation, anorexia and central depression. Additional objects will be apparent to those skilled in the art to which this invention pertains.

These and related objects have been accomplished by the provision of an aqueous suspension of terpin hydrate stabilized with glyceryl monostearate and a monostearate ester of a condensation polymer of the formula $$H(OCH_2CH_2)_nOH$$

wherein $n$ is a positive integer from thirty to fifty. The National Formulary grade of glyceryl monostearate is preferred. Polyoxyl 40 stearate U.S.P. is the preferred ester of the condensation polymer. Other useful polyoxyl stearates are those with degrees of polymerization of the polyoxyethylene moiety of from thirty to fifty.

The types and amounts of the various active ingredients and of the supplementary and complementary ingredients can be varied to suit the particular dosage requirements and the physical compatibilities required. The content of terpin hydrate can be varied from about 0.3 percent to about ten percent weight/volume with 1.7 percent preferred. The content of the monostearate ester of the condensation polymer can vary from about 0.05 percent to about 0.5 percent weight/volume with 0.1 percent preferred. It is preferred to use the National Formulary grade of glyceryl monostearate. The content of said monostearate can vary from about 0.2 percent to about one percent weight/volume with 0.5 percent preferred. Pharmaceutical grades of glyceryl monostearates other than N.F. can be used provided that the content of pure glyceryl monostearate is at least thirty percent by weight. In the case of the preferred antitussive agent, dextromethorphan hydrobromide, the operative range is from about 0.04 to about 0.4 percent weight/volume with 0.2 percent preferred.

The basic method of preparation of the composition of the invention is to disperse glyceryl monostearate in the aqueous vehicle with the aid of polyoxyl 40 stearate and then add the terpin hydrate and other ingredients. The terpin hydrate is in a form suitable for suspensions and is preferably micronized. It is preferred to use heat in the dispersion of the glyceryl monostearate in the aqueous vehicle but other methods known in the art can be utilized. Active ingredients supplementing and complementing the action of terpin hydrate can be added to suspensions of the latter. Compounds possessing the beneficial therapeutic activities related to opium provide good supplementary ingredients. Suitable morphine and codeine derivatives, and compounds such as narcotine salts and dextromethorphan hydrobromide can be used, the latter being preferred. Additional complementary ingredients can include antihistaminics, for example, pyrilamine maleate, diphenhydramine hydrochloride, and promethazine hydrochloride; analgesics and antipyretics, for example, salicylamide, acetophenetidin, and N-acetyl-p-aminophenol; and vitamins, for example, vitamins of the B complex group and ascorbic acid. Decongestants, for example, phenylephrine hydrochloride, can be included as can other expectorants, for example, ammonium chloride, guaicol compounds and the like.

Supplementary ingredients and adjuvants can be added to the suspensions of this invention. Suitable surfactants include sorbitan monooleate, sorbitan monostearate, mixtures thereof, and the like which have a hydrophile-lipophile balance index of below five. Suspending agents and viscosity-increasing agents such as sodium carboxymethyl-cellulose, sorbitol, methylcellulose, gums such as tragacanth and acacia, alginates and carrageenates can be utilized. It is desirable to include preservatives such as methylparaben, butylparaben, propylparaben, sodium benzoate, sorbic acid, and the like, or mixtures thereof. Buffering agents, of which citric acid is preferred, can be incorporated into the suspensions. Also, conventional sweeteners such as sucrose, saccharin and cyclamate salts, and pharmaceutically acceptable flavors and dyes are useful supplementary ingredients. The pH must be sufficiently below pH 7 to keep any antitussive ingredient in solution without causing an unacceptable acidic reaction to the taste.

Compositions stabilized in suspension form by the technique of the invention do not show deleterious crystal growth and the insoluble phase does not aggregate and sediment under varying conditions of storage and handling. Upon ingestion they are free from sharpness and burning, have a pleasant taste and a soothing demulcent action on the mucous membranes. Uniform, satifactory dosages of the active ingredient are available without the use of an alcoholic vehicle.

The following examples are illustrative of the composition of the invention but are not to be construed as limiting.

*Example 1.—Stable Aqueous Suspension Of Terpin Hydrate*

Each cc. contains:

| | |
|---|---|
| Citric acid hydrate powder USP __percent__ | 0.15 |
| Methylparaben USP _____do____ | 0.1 |
| Propylparaben USP _____do____ | 0.05 |
| Sodium carboxymethylcellulose high viscosity _____do____ | 0.7 |
| Glyceryl monostearate NF _____do____ | 0.5 |
| Polyoxyl 40 stearate USP _____do____ | 0.1 |
| Cyclamate sodium _____do____ | 2 |
| Sorbitan monooleate _____do____ | 0.05 |
| Terpin hydrate powder NF (micronized) mg.__ | 17 |
| Sorbitol solution NF, v./v. _____percent__ | 32.29 |
| Certified dye _____do____ | 0.0055 |
| Flavors _____do____ | 0.156 |
| Deionized water, q.s. | |

About 45 gallons deionized water are heated to ninety degrees centigrade. The citric acid, methylparaben, propylparaben, sodium carboxymethylcellulose, glycerol monostearate and polyoxyl 40 stearate are added. The solution is stirred while cooling spontaneously. When the solution reaches 45 degrees centigrade or below, the cyclamate sodium, sorbitan monooleate and the micronized terpin hydrate are added and deionized water q.s.—ad 100 gallons. The suspension is stirred for three hours and processed through a homogenizer. The suspension is stirred after homogenizing to reduce air volume. A suspension so prepared does not shown excessive crystal growth or aggregation and remains stable and easily resuspendible for a period of at least twelve months.

*Example 2.—Stable Aqueous Suspension of Terpin Hydrate With d-Methorphan Hydrobromide*

The preferred embodiment of the composition in the case of terpin hydrate aqueous suspension with a medullary cough center depressant is represented by the following formula.

Each cc. contains:

| | |
|---|---|
| Citric acid hydrate powder USP __percent__ | 0.15 |
| Methylparaben USP _____do____ | 0.1 |
| Propylparaben USP _____do____ | 0.05 |
| Sodium carboxymethylcellulose high viscosity _____do____ | 0.7 |
| Glyceryl monostearate NF _____do____ | 0.5 |
| Polyoxyl 40 stearate USP _____do____ | 0.1 |
| d-Methorphan hydrobromide _____mg.__ | 2 |
| Cyclamate sodium _____percent__ | 2 |
| Sorbitan monooleate _____do____ | 0.05 |
| Terpin hydrate powder NF (micronized) mg.__ | 17 |
| Sorbitol solution NF, v./v. _____percent__ | 32.29 |
| Certified dye _____do____ | 0.0055 |
| Flavors _____do____ | 0.156 |
| Deionized water, q.s. | |

About 45 gallons of deionized water are heated to ninety degrees centigrade. The citric acid, methylparaben, propylparaben, sodium carboxymethylcellulose, glyceryl monostearate and polyoxyl 40 stearate are added. The solution is stirred while cooling spontaneously. When the solution reaches 45 degrees centigrade or below, the d-methorphan hydrobromide, cyclamate sodium sorbitan monooleate and the micronized terpin hydrate are added. The sorbitol solution, colors and flavors are added and q.s. deionized water—ad 100 gallons. The suspension is stirred for three hours and processed through a homogenizer. The suspension is stirred after homogenizing to reduce air volume. A suspension prepared in this manner does not show deleterious crystal growth or excessive aggregation and remains stable and easily resuspendible for a period of at least twelve months.

*Example 3.—Stable Aqueous Suspension of Terpin Hydrate*

Following the procedure of Example 1, aqueous suspensions are prepared by using three and 100 milligrams, respectively, of terpin hydrate to replace the seventeen milligrams of Example 1. Such suspensions do not show deleterious crystal growth or aggregation and remain easily resuspendible for a period of at least twelve months.

*Example 4.—Stable Aqueous Suspension of Terpin Hydrate With Dextromethorphan Hydrobromide*

Following the procedure of Example 2, aqueous suspensions are prepared by using 0.4 milligram and four milligrams, respectively, of dextromethorphan hydrobromide to replace the two milligrams of Example 2. Such suspensions do not show deleterious crystal growth and remain easily resuspendible for a period of at least twelve months.

*Example 5.—Stable Aqueous Suspension of Terpin Hydrate With an Antihistaminic Agent and a Decongestant*

Following the procedure of Example 1, an aqueous suspension is prepared by adding five milligrams per milliliter of pyrilamine maleate, U.S.P. and one milligram per milliliter of phenylephrine hydrochloride to the formula of Example 1. Such a suspension does not show deleterious crystal growth and remains easily resuspendible for a period of at least twelve months.

*Example 6.—Stable Aqueous Suspension of Terpin Hydrate With an Analgesic-Antipyretic*

Following the procedure of Example 1, an aqueous suspension is prepared by adding sixty milligrams per milliliter of salicylamide to the formula of Example 1. Such a suspension does not show deleterious crystal growth and remains easily resuspendible for a period of at least twelve months.

*Example 7.—Stable Aqueous Suspension of Terpin Hydrate and Dextromethorphan Hydrobromide With an Analgesic*

Following the procedure of Example 2, an aqueous suspension is prepared by adding sixty milligrams per milliliter of acetophenetidin to the formula of Example 2. Such a suspension does not show deleterious crystal growth and remains easily resuspendible for a period of at least twelve months.

*Example 8.—Stable Aqueous Suspension of Terpin Hydrate With a Vitamin*

Following the procedure of Example 1, an aqueous suspension is prepared by adding twenty milligrams per milliliter of ascorbic acid to the formula of Example 1. Such a suspension does not show deleterious crystal growth and remains easily resuspendible for a period of at least twelve months.

*Example 9.—Stable Aqueous Suspension of Terpin Hydrate With Narcotine*

Following the procedure of Example 1, an aqueous suspension is prepared according to the following formula.

Each cc. contains:

| | |
|---|---|
| Citric acid hydrate Po. USP _____percent__ | 0.15 |
| Methylparaben USP _____do____ | 0.1 |
| Propylparaben USP _____do____ | 0.05 |
| Sodium carboxymethylcellulose high viscosity _____do____ | 0.7 |
| Glyceryl monostearate NF _____do____ | 0.2 |
| Polyoxyl 40 stearate USP _____do____ | 0.05 |
| Narcotine sulfate _____mg.__ | 1 |
| Cyclamate sodium _____percent__ | 2 |
| Sorbitan monooleate _____do____ | 0.05 |
| Terpin hydrate Po. NF (micronized) _mg.__ | 17 |
| Sorbitol solution NF, v./v. _____percent__ | 32.29 |
| Certified dye _____do____ | 0.0055 |
| Flavors, v./v. _____do____ | 0.156 |
| Deionized water, q.s. | |

*Example 10.—Stable Aqueous Suspension of Terpin Hydrate With Codeine*

Following the procedure of Example 1, an aqueous suspension is prepared according to the following formula.

Each cc. contains:

| | |
|---|---|
| Citric acid hydrate Po. USP _____percent__ | 0.15 |
| Methylparaben USP _____do____ | 0.1 |
| Propylparaben USP _____do____ | 0.05 |
| Sodium carboxymethylcellulose high viscosity _____do____ | 0.7 |
| Glyceryl monostearate NF _____do____ | 1.0 |
| Polyoxyl 40 stearate USP _____do____ | 0.5 |
| Codeine sulfate _____mg.__ | 2 |
| Cyclamate sodium _____percent__ | 2 |
| Sorbitan monooleate _____do____ | 0.05 |
| Terpin hydrate Po. NF (micronized) _mg.__ | 17 |
| Sorbitol solution NF, v./v. _____percent__ | 32.29 |
| Certified dye _____do____ | 0.0055 |
| Flavors, v./v. _____do____ | 0.156 |
| Deionized water, q.s. | |

It is to be understood that the invention is not to be limited to the exact details of operation or exact compositions shown and described herein, as obvious modifications and equivalents will be apparent to one skilled in the art, and the invention is therefore to be limited only by the scope of the appended claims.

I claim:

1. An aqueous therapeutic suspension comprising micronized terpin hydrate, glyceryl monostearate, and a monostearate of a condensation polymer having the formula $H(OCH_2CH_2)_nOH$ wherein $n$ is a positive integer from about thirty to about fifty.

2. An aqueous therapeutic suspension comprising micronized terpin hydrate, glyceryl monostearate, a monostearate of a condensation polymer having the formula $H(OCH_2CH_2)_nOH$ wherein $n$ is a positive integer from about thirty to about fifty, and a member selected from the group consisting of the salts of codeine, narcotine, morphine, and dextromethorphan.

3. An aqueous therapeutic suspension comprising micronized terpin hydrate, glyceryl monostearate, a monostearate of a condensation polymer having the formula $H(OCH_2CH_2)_nOH$ wherein $n$ is a positive integer from about thirty to about fifty, and a member selected from the group consisting of pyrilamine maleate, diphenhydramine hydrochloride, and promethazine hydrochloride.

4. An aqueous therapeutic suspension comprising micronized terpin hydrate, glyceryl monostearate, a monostearate of a condensation polymer having the formula $H(OCH_2CH_2)_nOH$ wherein $n$ is a positive integer from about thirty to about fifty, and a member selected from the group consisting of salicylamide, acetophenetidin, and N-acetyl-p-aminophenol.

5. An aqueous therapeutic suspension comprising micronized terpin hydrate, glyceryl monostearate, a monostearate of a condensation polymer having the formula $H(OCH_2CH_2)_nOH$ wherein $n$ is a positive integer from about thirty to about fifty, and a member selected from the group consisting of ascorbic acid, vitamin $B_1$, vitamin $B_6$ and riboflavin.

6. An aqueous therapeutic suspension comprising from about 0.3 percent weight/volume to about ten percent weight/volume of micronized terpin hydrate, from about 0.2 percent to about one percent weight/volume of glyceryl monostearate, and from about 0.05 percent to about 0.5 percent weight/volume of a monostearate of a condensation polymer having the formula $$H(OCH_2CH_2)_nOH$$

wherein $n$ is a positive integer from about thirty to about fifty.

7. An aqueous therapeutic suspension comprising from about 0.3 percent to about ten percent weight/volume of micronized terpin hydrate, from about 0.2 percent to about one percent weight/volume of glyceryl monostearate, from about 0.05 percent to about 0.5 percent weight/volume of a monostearate of a condensation polymer having the formula $H(OCH_2CH_2)_nOH$, wherein $n$ is a positive integer from about thirty to about fifty, and a member selected from the group consisting of codeine sulfate, narcotine hydrochloride, morphine sulfate and dextromethorphan hydrobromide.

8. An aqueous therapeutic suspension comprising about 1.7 percent weight/volume of micronized terpin hydrate, about 0.5 percent weight/volume of glyceryl monostearate, about 0.1 percent weight/volume of polyoxyl 40 stearate, a surfactant, and a suspending agent.

9. An aqueous therapeutic suspension comprising about 1.7 percent weight/volume of micronized terpin hydrate, about 0.5 percent weight/volume of glyceryl monostearate, about 0.1 percent weight/volume of polyoxyl 40 stearate, and about 0.2 percent weight/volume of dextromethorphan hydrobromide.

10. An aqueous therapeutic suspension comprising about 1.7 percent weight/volume of micronized terpin hydrate, about 0.5 percent weight/volume of glyceryl monostearate, about 0.1 percent weight/volume of polyoxyl 40 stearate, about 0.7 percent weight/volume of sodium carboxymethylcellulose and about 0.05 percent volume/volume of sorbitan monooleate.

11. An aqueous therapeutic suspension comprising about 1.7 percent weight/volume of micronized terpin hydrate, about 0.5 percent weight/volume of glyceryl monostearate, about 0.1 percent weight/volume of polyoxyl 40 stearate, about 0.2 percent weight/volume of dextromethorphan hydrobromide, about 0.7 percent weight/volume of sodium carboxymethylcellulose, and about 0.05 percent volume/volume of sorbitan monooleate.

12. An aqueous therapeutic suspension comprising about 1.7 percent weight/volume of micronized terpin hydrate, about 0.5 percent weight/volume of glyceryl monostearate, about 0.1 percent weight/volume of polyoxyl 40 stearate, about 0.2 percent weight/volume of dextromethorphan hydrobromide, and about 0.6 percent weight/volume of acetophenetidin.

References Cited in the file of this patent

UNITED STATES PATENTS 2,671,750    Macek _____ Mar. 9, 1954

OTHER REFERENCES

U.S. Dispensatory, 25th edition, 1955, pp. 1087, 613, 614, 1388, and 1389.

Manufacturing Chemist, December 1945, pg. 441.

Remington's Practice of Pharmacy, 1956, pp. 139, 186, and 188–191.

Burlage: Fundamental Principles and Processes of Pharmacy, 1949, McGraw-Hill Book Co., N.Y., N.Y., pp. 432 and 433.